Jan. 12, 1971    R. E. PRICE    3,553,907
GRINDING MACHINE FOR RING-LIKE WORKPIECES
Filed June 7, 1967    4 Sheets-Sheet 1

INVENTORS
RALPH E. PRICE &
GLENN M. SNYDER

BY Mason, Porter, Diller & Brown
ATTORNEYS

INVENTORS
RALPH E. PRICE &
GLENN M. SNYDER

BY Mason, Porter, Diller & Brown
ATTORNEYS

United States Patent Office 3,553,907
Patented Jan. 12, 1971

3,553,907
GRINDING MACHINE FOR RING-LIKE WORKPIECES
Ralph E. Price and Glenn M. Snyder, Waynesboro, Pa., assignors to Litton Industries, Inc., a corporation of Delaware
Filed June 7, 1967, Ser. No. 644,181
Int. Cl. B24b 47/02
U.S. Cl. 51—215
18 Claims

ABSTRACT OF THE DISCLOSURE

This subject has to do with a holder for workpieces during the production machining of the external surfaces thereof. The holder is in the form of a work clamping assembly which includes a rotating faceplate and a work clamping unit which tightly clamps a workpiece against the faceplate. The improvement specifically resides in the provision of a work centering means which will assure a fixed axis for the rotation of the work during grinding and a work clamping member for holding a workpiece against said faceplate with enough force applied axially to resist radial forces tending to displace said work from said fixed axis, wherein the spindle has one or more flexible sections to permit the clamping of a workpiece in centered relation with respect to the axis of the rotation of the faceplate notwithstanding irregularities in the workpiece.

---

This invention relates to apparatus for machining, particularly by grinding, the external peripheral surfaces of annular workpieces.

The present apparatus utilized for grinding this type of work is usually what is known as a shoe-type centerless grinder. In such a machine, a workpiece is mounted on a faceplate magnetically or by mechanical pressure. During the grinding operation, the workpiece is supported radially by peripherally spaced shoes engaging the surface being ground, one shoe being adjacent the grinding wheel, and the other shoe engaging the periphery of the workpiece being ground at a point less than 180 degrees from the point of contact between the workpiece and the grinding wheel.

The roundness of a finished workpiece depends on this peripheral spacing and the arrangement of the supporting shoes and grinding wheel. This is substantially the same arrangement as found in conventional centerless grinders in which the regulating wheel corresponds to the supporting shoe which is spaced or located furthest from the grinding wheel. The purpose of positioning the regulating wheel and shoe less than 180 degrees from the grinding wheel is to prevent the grinding of a lobe pattern on the workpiece. By gradual reduction of out-of-round portions of a workpiece when supported in this manner, the work surface approaches, but never qiute reaches perfect roundness.

In order to produce maximum roundness in such workpieces, it is essential that they be rotated about the same axis of rotation as the work driving member during the grinding operation. In the past, this relation has been accomplished by use of conventional jaw-type chucks. However, the force applied by the chuck jaws to hold the workpiece against rough grinding action results in distortion of the workpiece which prevents the finished ground workpiece from being ground within required limits. In order to avoid such distortion, it is necessary that the work be free of any radial restraint in the form of supporting or driving forces during a grinding operation. This may be accomplished by holding the workpiece against the faceplate by a force applied in an axial direction sufficient to hold the workpiece by friction against radial movement by the grinding wheel.

In view of the foregoing, it is the primary object of this invention to provide means for locating and supporting a workpiece for rotation about a predetermined axis.

Another object of this invention is to provide a work clamping assembly which will prevent radial displacement of the workpiece axis during the grinding thereof.

Another object of this invention is to provide means for frictionally resisting or preventing radial movement of a workpiece on a face plate during a grinding operation while avoiding radial deformation of the surface being ground.

A further object of this invention is to provide means for holding the workpiece concentric to the faceplate during the grinding of the workpiece.

In its simplest and preferred form, the invention includes means for locating a workpiece radially on a fixed plate for rotation about the axis of rotation of the faceplate. This is accomplished by means of a centering device which engages peripherally spaced points on the internal surface of the workpiece preferably that portion of the surface adjacent the faceplate as the workpiece is moved towards the faceplate by the holding or clamping member. The clamping member is rotatably supported in substantially co-axial relation with the workpiece until the work is clamped. The clamping member exerts sufficient axial force on the workpiece that the friction between the workpiece and the faceplate prevents deviation of the workpiece from the fixed axis of rotation of the faceplate by the radial forces exerted on the workpiece during grinding.

In accordance with this invention, the workpiece is located by the centering device in fixed relation to the axis of the work driving spindle with one annular surface of the workpiece held against the faceplate by pressure applied by a work clamping unit engaging the other annular surface of the workpiece.

The work clamping unit is initially held in substantially axial alignment with the axis of rotation of the faceplate, but with portions thereof free to flex slightly if necessary as a workpiece is engaged in order to assure uniform distribution of the clamping force on the exposed annular surface of the workpiece. Once the workpiece has been clamped, the end of the work clamping unit adjacent the workpiece is released from its support and is free to flex radially to prevent any misalignment between the axis of the workpiece and the axis of the work clamping unit from affecting the relation between the workpiece and a grinding wheel. By centering the workpiece in relation to the faceplate axis of rotation and holding it against the faceplate by friction on its annular surface so that it does not deviate from the faceplate axis during grinding, radial forces which would adversely affect the roundness of the finished workpiece are counteracted.

The flexible portion of the work clamping assembly adjacent the work engaging portion thereof permits the work engaging portion to adapt itself to any irregularity in the annular surface of the workpiece contacted thereby. After the workpiece engages the faceplate, it is held against radial movement by the centering device carried by the faceplate even though the axis of the faceplate and the axis of the work clamping unit are not in perfect axial alignment. As the pressure holding the work against the faceplate is increased, the spindle of the work clamping unit is released from the radial support of a surrounding supporting member. At this point a second flexible portion of the spindle becomes effective to prevent any misalignment from effecting the radial position of the workpiece. The clamping member may, if necessary, rotate in an orbital path determined by the amount of variation from perfect axial alignment.

With the above and other objects in view that will hereinafter appear, the nature of the invention will be more clearly understood by reference to the following detailed description, the appended claims and the several views illustrated in the accompanying drawings:

In the drawings:

FIG. 7 is a schematic view showing the manner in which the work centering device is actuated.

Figure 1:
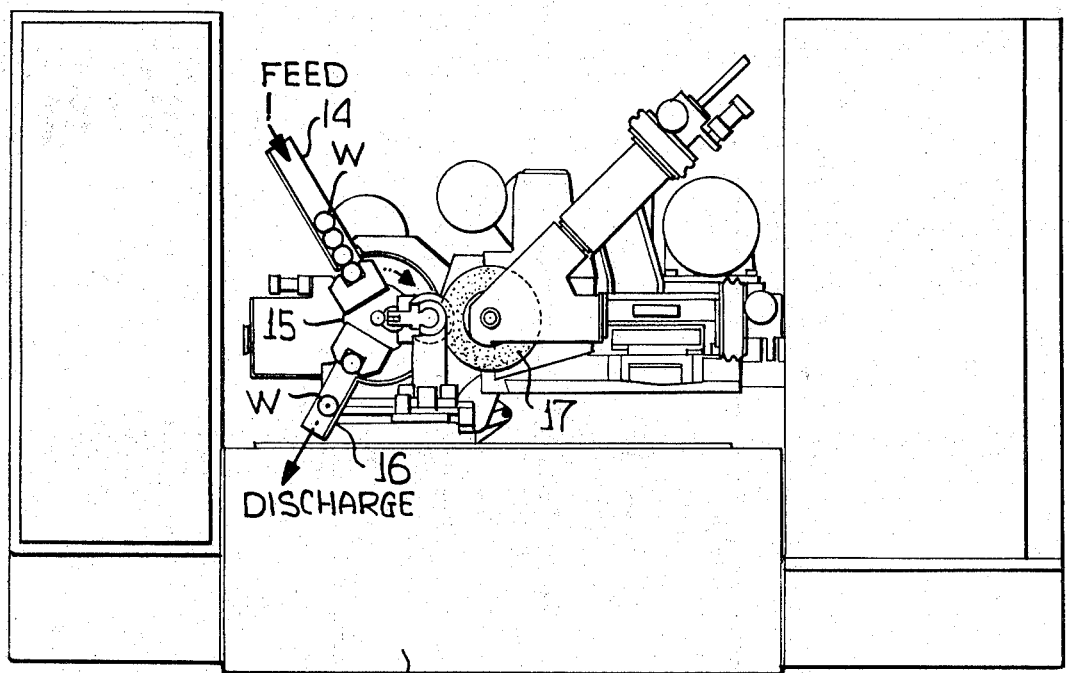
FIG. 1 is a front elevational view of the grinder.
Figure 2:
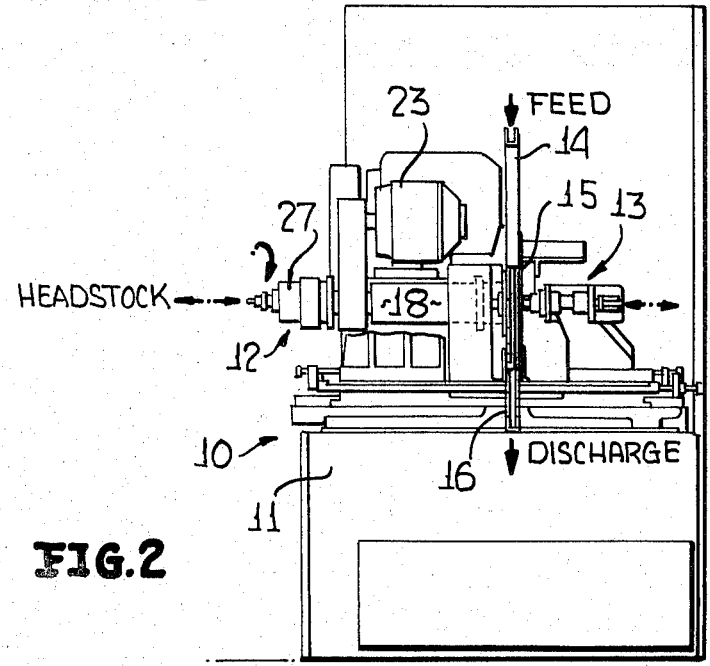
FIG. 2 is an end elevational view of the grinder.

Referring now to the drawings in detail, it will be seen that there is illustrated in FIGS. 1 and 2 an automatic grinder which is generally referred to by the numeral 10. The grinder 10 includes a suitable base 11 on which there are mounted the necessary work feeding and supporting elements and the usual grinding wheel support, grinding wheel driving elements, and grinding wheel dressing and feed mechanisms. The details of only those elements of the grinder 10 which relate to this invention will be described here.

Basically, the grinder 10 includes a headstock, which is generally referred to by the numeral 12, and a tailstock or work clamping unit which is generally referred to by the numeral 13, the headstock and the work clamping unit cooperate to clamp and rotate a workpiece during the grinding or other machining operation.

Workpieces W are delivered to the grinder 10 down a feed chute 14 into a loader 15 of the indexing type which sequentially positions workpieces to be machined between the headstock 12 and the work clamping unit 13. There is also a discharge chute 16 for receiving machined workpieces W from the loader 15.

The grinder 10, of course, includes the usual grinding wheel 17 which is mounted in the customary manner for performing a grinding operation on the external surface of a workpiece W clamped between the headstock 12 and the work clamping unit 13.

The headstock 12 includes a housing 18 having positioned therein suitable bearings (not shown) rotatably supporting a work drive spindle 20. A work drive member 21 is releaseably secured to one end of the spindle 20 and has a faceplate 22 attached thereto. The spindle 20 may be continuously driven by means of a suitable power unit 23.

Figure 4:
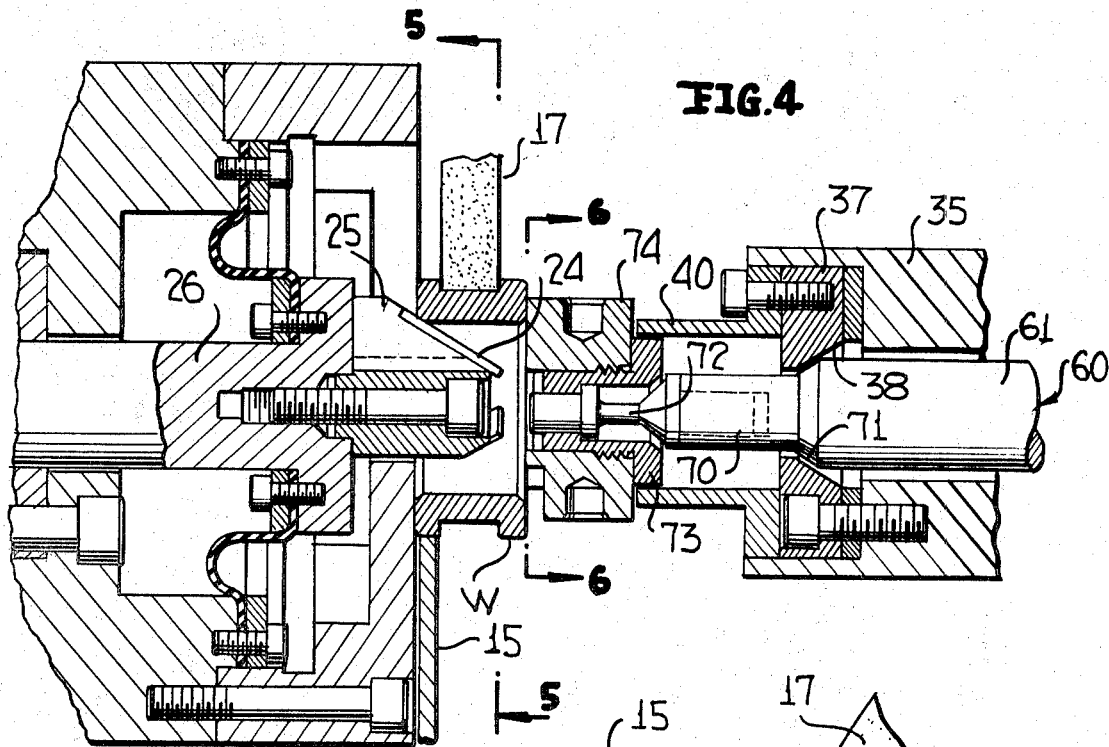
FIG. 4 is an enlarged fragmentary sectional view showing a workpiece clamped against the face plate in centered relation during a rough grinding operation.
Figure 5:
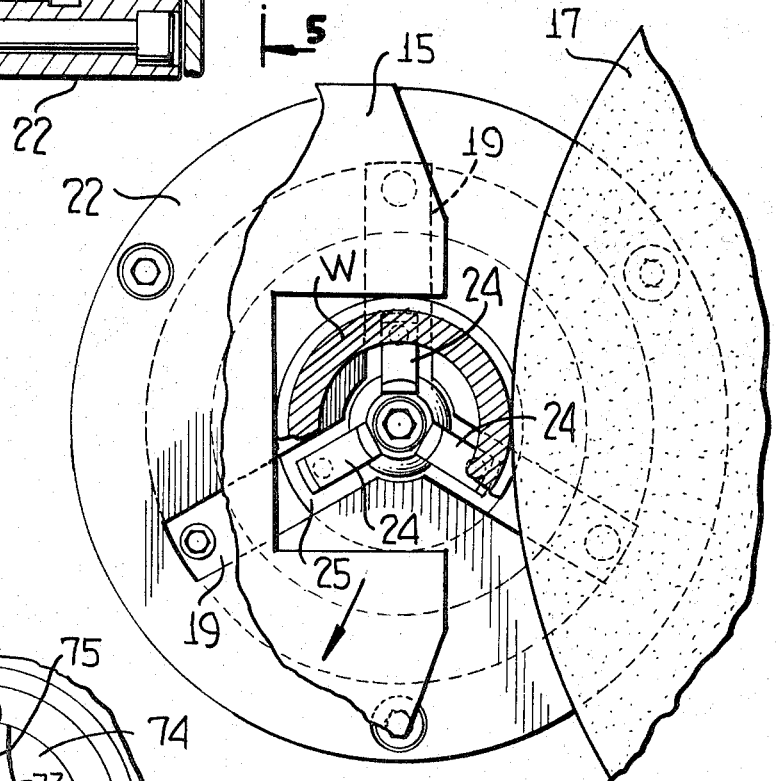
FIG. 5 is an enlarged fragmentary transverse sectional view taken along the line 5—5 of FIG. 4 and shows the specific details of the work centering device and the relationship thereof to the faceplate.

The faceplate 22, as is best shown in FIGS. 4 and 5, has formed therein three angularly spaced slots 19 through which correspondingly spaced work engaging members 24 extend. The work engaging members 24 are parts of a conically shaped work centering device 25 which is attached to one end of a draw rod 26 which is slidably mounted within the spindle 20. The dimensions of the work centering device 25 are such that workpieces having different internal diameters may be accommodated. A centering device of this type in contact with the internal surface of the workpiece need only contact one edge of said surface. To use a centering device of this type, it is not necessary that the internal surface of the work be ground or otherwise machined.

At the end of the spindle 20 remote from the faceplate 22, the headstock includes a fluid motor 27, as is best shown in FIG. 2. With particular reference to FIG. 7, it will be seen that the fluid motor 27 is coupled to the draw rod 26 for positioning the work centering device 25. The fluid motor 27 includes a cylinder 28 in which there is mounted a piston 29. The piston 29 is coupled to a piston rod 94 which is coupled to a yoke 95 by means of a rotary connection 96. This permits the yoke 95 to rotate while the piston rod 94 remains rotationally stationary.

The yoke 95 has a reduced diameter extension 97 and the left end of the draw rod 26 extends into the yoke 95 through the reduced extension 97 and is coupled to the yoke 95 for relative axial movement with respect thereto and for rotational movement therewith by means of a pin and slot connection 98. The draw rod 26 and the work centering device 25 carried thereby are urged to a projecting position by means of a spring 99 which extends between the yoke 95 and a collar 100 on the draw rod 26. It will be readily apparent that when an axial pressure towards the left, as viewed in FIG. 7, is applied against the work centering device 25, the draw rod 26 is movable to the left against the compression of the spring 99. The spring 99 exerts sufficient force to maintain contact of the work centering device with a workpiece W.

Figure 3:
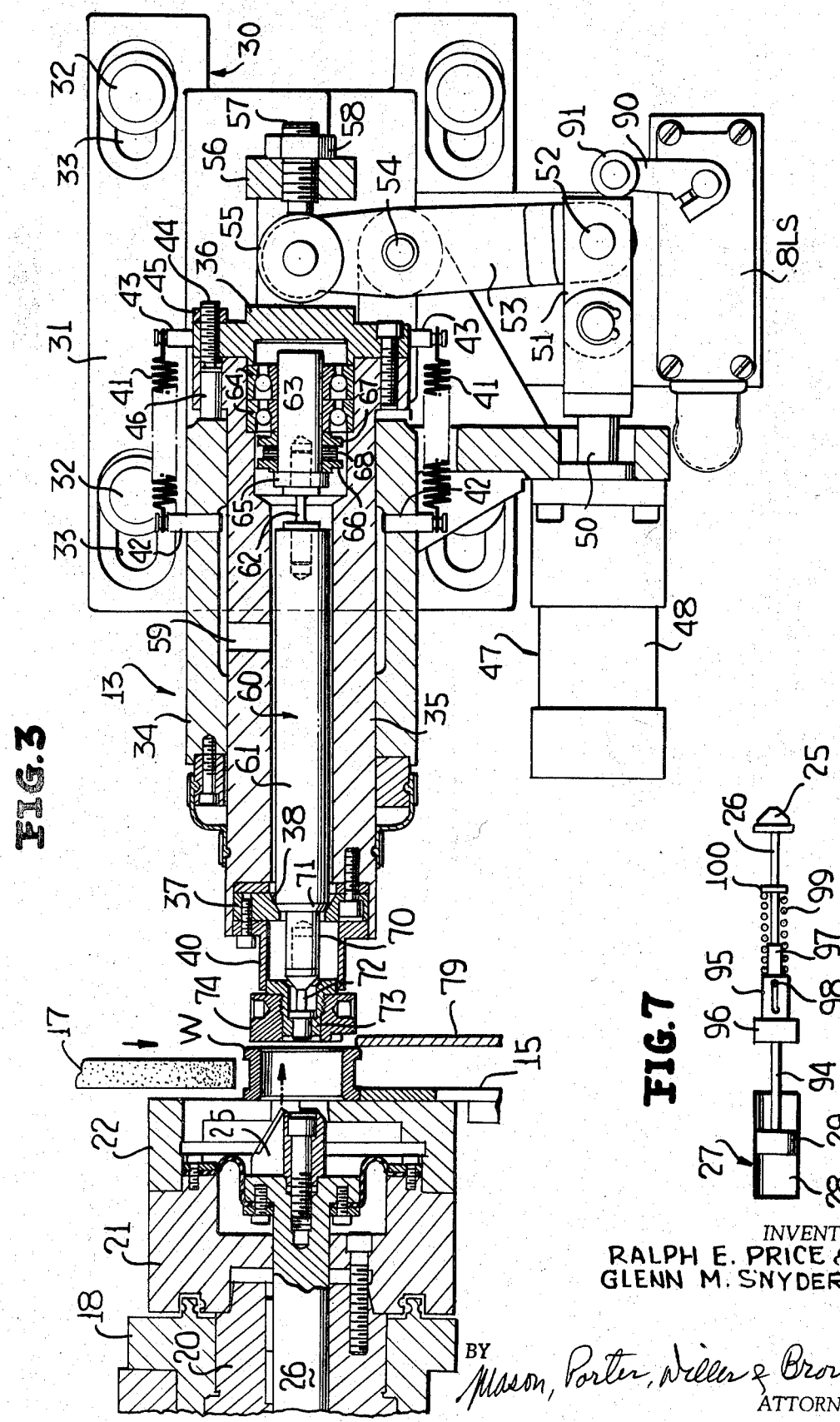
FIG. 3 is an enlarged fragmentary longitudinal sectional view taken through the work supporting portion of the grinder.

Referring now to FIG. 3 in detail, it will be seen that there is illustrated the specific details of the work clamping unit 13. The work clamping unit 13 includes a suitable support 30. The support 30 is formed of a plate portion 31, which is adjustably mounted on the grinder 10 by means of fasteners 32 passing through slots 33 in the plate. The plate portion 31 carries a sleeve 34 which is also part of the support 30.

The sleeve 34 has mounted therein for limited sliding movement a tubular support or housing 35. The tubular support 35 is provided with a removable cap 36 at the end thereof remote from the faceplate 22. The opposite end of the tubular support 35 is partially closed by a ring 37 having a conical surface 38 which generally faces toward the cap 36. The tubular support 35 has projecting therefrom towards the faceplate 22 a sleeve 40, the purpose of which will be described hereinafter.

It is to be noted that the tubular support 35 is constantly urged to the left within the sleeve 34 by means of a pair of tension springs 41. The tension springs 41 are anchored at their left ends on pins 42 extending from the sleeve 34 and at their right ends on pins 43 carried by the cap 36. Movement of the tubular support 35 to the left is limited by an adjustable stop screw 44 which is retained in an adjusted position by means of a lock nut 45. The stop screw 44 engages a pin 46 carried by the sleeve 34. The adjustment of screw 44 is such as to maintain a predetermined clearance between the left end of sleeve 40 and the right side of work clamping member 74.

Figure 9:
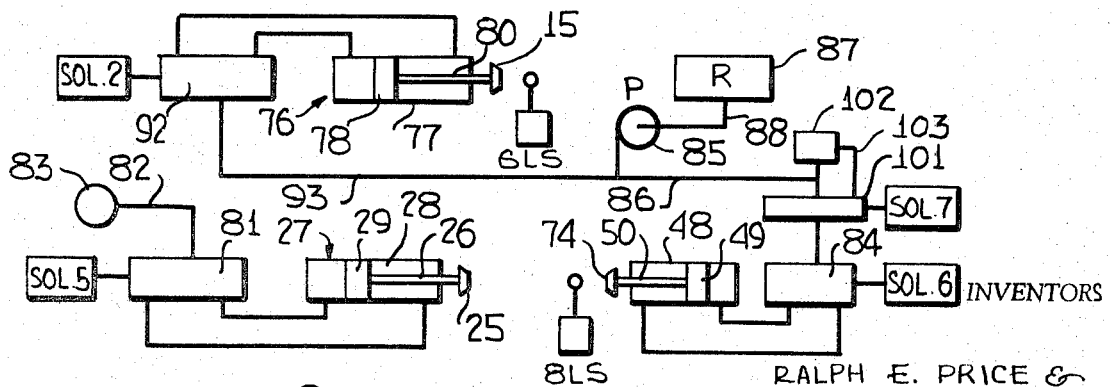
FIG. 9 is a schematic of the fluid control system of the machine.

The tubular support 35 is moved axially within the sleeve 34 by means of a fluid motor, which is generally referred to by the numeral 47. The fluid motor 47 includes a cylinder 48 which is suitably carried by the support 30 and which, as is best shown in FIG. 9, has a piston 49 mounted therein for advancing and retracting movement. The piston 49 carries a piston rod 50 which, in turn, carries a bifurcated link 51 which is pivotally connected by means of a pivot pin 52 to the lower end of a lever 53. The lever 53 is pivotally mounted intermediate its ends on a pivot pin 54 which is suitably carried by the support 30. The opposite end of the lever 53 carries a roller 55 which is positioned within a yoke 56 integrally formed with the cap 36. The yoke 56 has an adjustable stop screw 57 which is engaged by the roller 55 to effect the movement of tubular support 35 to the right against the tension of the springs 41. The stop screw 57 is retained in an adjusted position by means of a lock nut 58.

There is mounted within the tubular support 35 for both rotation and axial movement relative to the tubular support 35 a spindle, which is generally referred to by the numeral 60. The spindle 60 includes a central shaft portion 61 having a flexible section 62 at the right end thereof, as viewed in FIG. 3. The flexible section 62 may be any suitable flexible connection which is capable of transmitting thrust. The flexible section 62, in turn, is secured to a shaft portion 63. The shaft portion 63 is mounted for both rotary and axial movement within a pair of bearings 64 carried by the tubular support 35. The end of the shaft portion 63 to which the flexible section 62 is coupled is enlarged to define a shoulder portion 65 against which a collar 66 bears. A second collar 67, also carried by the shaft portion 63, abuts against an adjacent one of the bearings 64. Intermediate the collars 66 and 67 there is a predetermined number of Belleville springs or washers 68 which constant urge the spindle 60 to the left, as viewed in FIG. 3.

The left end of the central shaft portion 61 is reduced as at 70 and the central shaft portion 61 has a conical surface 71 opposing the conical surface 38 of the ring 37. The Belleville washers 68 maintain contact between the conical surfaces 38 and 71 and in the inoperative position of the work clamping unit 13 the engaged surfaces 38 and 71 support the spindle 60 rigidly in alignment with the faceplate 22.

Figure 6:
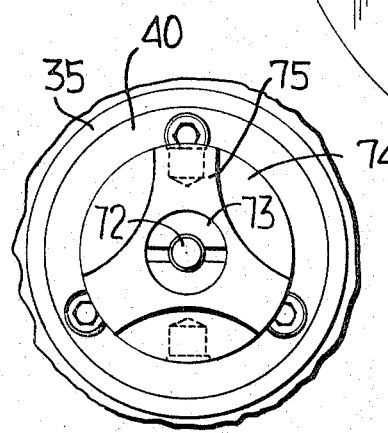
FIG. 6 is an enlarged fragmentary sectional view taken along the line 6—6 of FIG. 4 and shows the specific details of the work clamping member.
Figure 8:
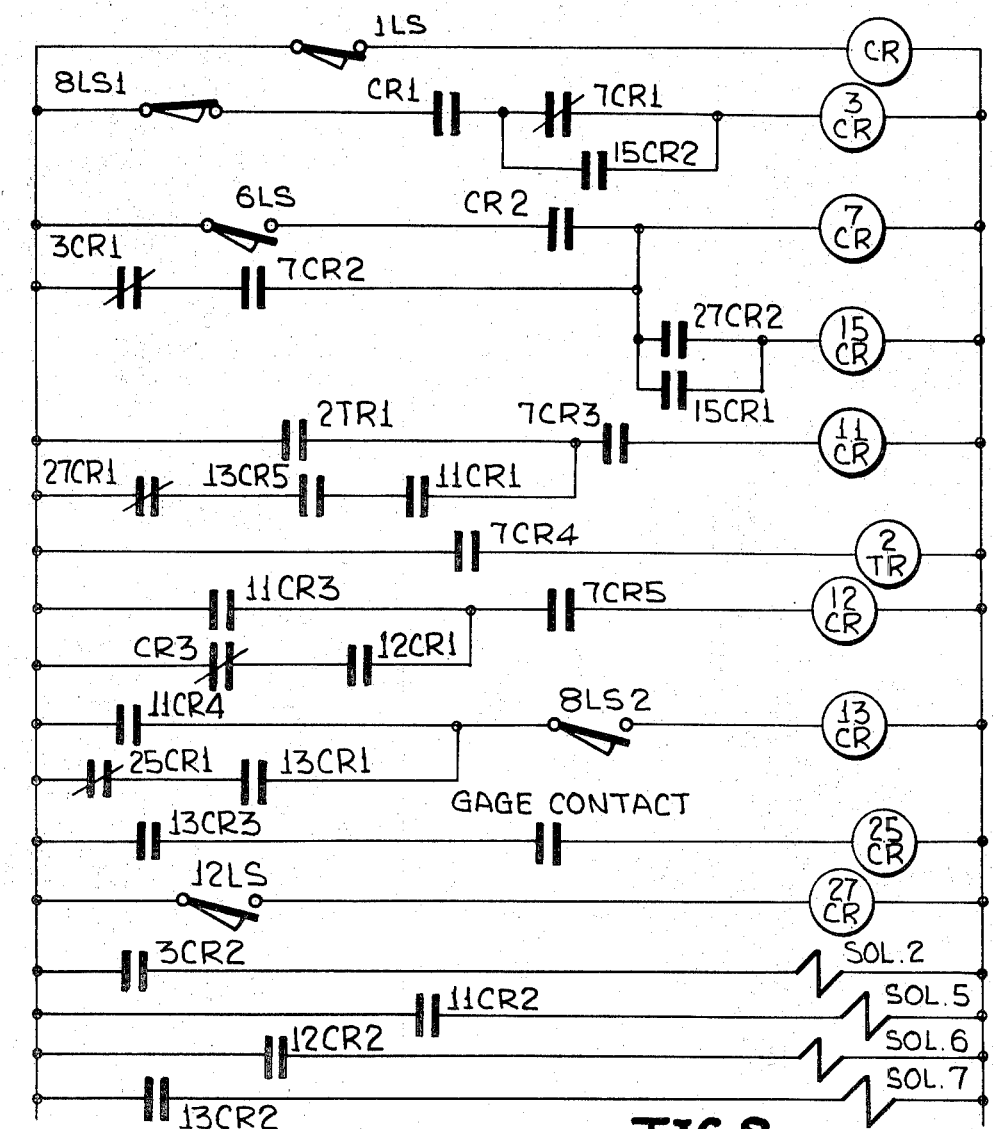
FIG. 8 is a wiring schematic for effecting the automatic operation of the machine.

The left end of the spindle 60 terminates in a flexible section 72. Flexible section 72 may also be any suitable flexible connection capable of transmitting thrust. The flexible section 72 carries a bushing 73 on which there is removably mounted a work clamping member 74. As is best illustrated in FIG. 6, the work clamping member 74 has a face portion which is contoured to define angularly spaced portions 75.

At this time it is pointed out that the function of the sleeve 40 is to protect the clamping elements at that point against dirt and moisture. This is accomplished by air under pressure which is constantly discharged between the sleeve 40 and the work clamping member 74. This air under pressure is supplied thru an opening 59 in the tubular support 35. This air supply is mixed with oil to provide a lubricating mist for the bearings 64.

OPERATION

In the starting position of the machine, both the work centering device 25 and the work clamping member 74 are in retracted positions with there being sufficient space between the faceplate 22 and the work clamping member 74 to permit a workpiece to be freely passed. While the workpiece is guided by means of a suitable guide 79, the loader 15 is indexed to present a workpiece W between the faceplate 22 and the work clamping member 74 is substantially the position shown in FIG. 3, in which position the workpiece W is substantially centered relative to the axis of rotation of the faceplate 22, with which axis the axis of the spindle 60 is in substantial alignment.

The loading device 15 is actuated by means of a fluid motor, which is generally referred to by the numeral 76. The fluid motor 76 includes a cylinder 77 in which there is mounted a piston 78 having coupled thereto a piston rod 80, which, in turn, is connected to the loader 15 in a conventional manner to effect the indexing thereof.

When the loading device or loader indexer 15 places an unground workpiece W in grinding position, it closes reset limit switch 6LS which completes a circuit through a previously closed contact CR2, which is controlled by the position of the wheel base supporting the grinding wheel 17, to energize a relay 7CR. When the relay 7CR is energized, normally closed contact 7CR1 opens to de-energize loader relay 3CR, permitting the loader mechanism to reset and opening reset limit switch 6LS.

It is to be understood that the relay 3CR opens prior to the opening of the limit switch 6LS. When the relay 3CR is de-energized, normally closed contact 3CR1 closes in the holding circuit through then closed contact 7CR2 to complete the holding circuit for the relay 7CR and retain the same energized after the limit switch 6LS opens.

Contact 7CR3 closes in the circuit to centering guide relay 11CR, but does not complete the circuit to that relay at this time. Also, contact 7CR4 closes to energize timer relay 2TR. This results in the closing of contact 2TR1 to complete a circuit through contact 7CR3 to energize relay 11CR.

The energization of relay 11CR results in contact 11CR1 closing in a holding circuit which includes normally open contact 13CR5 and normally closed contact 27CR1.

Contact 11CR2 closes to energize guide solenoid 5 which, as is best illustrated in FIG. 9, controls the setting of a valve 81 which, in turn, controls the operation of the fluid motor 27. The valve 81 is coupled by means of a supply line 82 to a source of compressed air 83. The shift in the valve 81 due to the energization of the solenoid 5 is effected to cause the draw rod 26 to move to the right, moving the work centering device 25 to the right.

At the same time, the contact 11CR2 closes to energize the guide solenoid 5, contact 11CR3 closes and completes a circuit through previously closed contact 7CR5 to energize clamp relay 12CR. This results in contact 12CR1 closing in a holding circuit so that the clamp will remain operative after the work centering device 25 is retracted and the contact 11CR3 opens. Normally closed contact CR3 in series with contact 12CR1, prevents the release of the clamp until the wheel is retracted.

Contact 12CR2 closes and completes a circuit to energize clamp solenoid 6 which controls the position of a valve 84 for directing fluid under pressure to the head end of the cylinder 48, shifting the piston 49 to the right in FIG. 3 and tubular support 35 to the left. Hydraulic fluid under pressure is supplied to the valve 84 by means of a pump 85 through a line 86 with the pump receiving hydraulic fluid from a reservoir 87 through a line 88.

At this time it is pointed out that the fluid line 86 branches and is coupled both to a clamp pressure selector valve 101 and a pressure reducing valve 102. The outlet of the pressure reducing valve 102 is coupled to the clamp pressure selector valve by means of a fluid line 103. During the initial operation of the clamp 74, the clamp pressure selector valve 101 is in a position for directing fluid at a reduced pressure received from the pressure reducing valve 102 to the valve 84 so that the initial operation of the clam 74 is under a pressure lower than the final clamping pressure.

The movement of the piston 49 to effect the shifting of the tubular support 35 is transmitted from the piston 49 through the piston rod 50 to the link 51 which, in turn, through the lever 53 effects the shifting of the cap 36 which is directly coupled to the tubular support 35.

The clamp 74 engages the workpiece W and moves it in the direction of the faceplate 22. At the same time, the workpiece moves into contact with the work engaging members 24 of the centering device 25 which guide it into centering relation with the faceplate 22 just prior to engagement of the workpiece with the faceplate, so that the workpiece and centering device move to the left as a unit for a brief period, with the centering device being held yieldingly against the movement of the clamping member by the spring 99.

At this time it is to be noted that any irregularity of the annular surface of the workpiece W engaged by the angular spaced portion 75 of the work clamping member is initially compensated for by the flexible section 72 of the spindle 60. When the workpiece W becomes clamped against the faceplate 22, axial movement of the spindle 60 is stopped. However, during the movement of the spindle 60 to the workpiece clamping position, the spindle 60 is held firmly against radial movement by engagement between the surfaces 38 and 71.

After the workpiece is firmly clamped against the faceplate 22 and movement of the spindle 60 to the left is discontinued, the tubular support 35 continues to move to the left a short distance as permitted by the stop screw 44. During this continued movement of the tubular support 35, the Belleville springs or washers 68 are compressed by the movement of the collar 67 with the tubular support 35. In response to this movement of the tubular support 35, the co-acting surfaces 38 and 71 are separated and the spindle 60 becomes free to move radially as permitting by the flexible section 62 to compensate for any out of line relation between the axis of the clamp 74 and the axis of the face plate 22.

It is to be noted that the limit switch 8LS has an actuating arm 90 which is positioned immediately adjacent the bifurcated link 51 and the arm 90 has a follower 91 which is engaged by the link 51. The relative position of the limit switch 8LS with respect to the link 51 is such that when the tubular support 35 is moved all of the way to the left, as determined by the setting of the stop screw 44, and the workpiece W is clamped against the faceplate 22, the limit switch 8LS is actuated to open the contact 8LS1 and close the contact 81S2. The closing of the contact 8LS2 results in the completion of a circuit through previously closed contact 11CR4 to energize the relay 13CR. When the relay 13CR is energized, in a conventional manner not shown, the grinding wheel 17 is advanced towards the workpiece for a grinding operation. At the same time, contact 13CR1 completes a holding circuit through normally closed contact 25CR1 to hold the relay 13CR energized after the relay 11CR is de-energized and the contact 11CR4 is opened.

Contact 13CR2 also closes to complete a circuit to energize the clamp pressure selector solenoid 7. The solenoid 7 shifts the selector valve 101 to the left, changing the connection to the valve 84 from low pressure through the fluid line 103 to high pressure directly through the fluid line 86. Thereafter, the clamp 74 holds the workpiece against the faceplate 22 with sufficient force to resist and prevent displacement of the workpiece W from its coaxial relation with the faceplate 22.

Contact 13CR3 closes in the circuit to relay 26CR. This circuit includes a currently open GAGE CONTACT.

The grinding operation proceeds to a positive stop at which point feed completion limit switch 12LS is closed to energize relay 27CR. The grinding operation continues automatically as a conventional spark out operation. However, at this time normally closed contact 27CR1 opens to open the holding circuit for the relay 11CR to de-energize the same. The de-energization of the relay 11CR results in the opening of the contact 11CR2 to de-energize the solenoid 5, thereby permitting the valve 81 to shift to a position wherein the piston 29 moves to the left, as viewed in FIGS. 7 and 9, to effect the withdrawal of the work engaging members 24 of the work centering device 25 from the workpiece, thus removing the only radial forces acting on the workpiece. It is to be understood that this withdrawal of the work engaging members 24 occurs prior to the spark out operation and while the work is still oversize, thereby eliminating any undesired influence of the work engaging members 24 on the workpiece during the final grinding of the workpiece to size.

Contact 11CR3 opens in the circuit to relay 12CR, but relay 12CR is held by contacts CR3 and 12CR1. Contact 11CR4 opens in the circuit to relay 13CR which is held by contact 13CR1 and normally closed contact 25CR1.

The contact 27CR2 closes to energize the relay 15CR through the circuit including the normally closed contact 3CR1 and the presently closed contcat 7CR2. As a result, contact 15CR1 holds the relay 15CR energized when the feed completion contact 27CR2 opens upon the retraction of the feed for the grinding wheel 17.

Contact 15CR2 closes to provide a circuit around normally closed contact 7CR1 (now open) in the circuit to relay 3CR. At the end of the spark out grinding operation when the workpiece has been ground to size, a conventional sizing gauge (not shown) functions to close the GAGE CONTACT thereby completing a circuit to energize relay 25CR. The normally closed contact 25CR1 opens to de-energize the infeed relay 13CR, thereby effecting the retraction of the grinding wheel 17. When the grinding wheel 17 is retracted, limit switch 1LS is closed, energizing relay CR. Contact CR1 closes in the circuit to relay 3CR.

Normally closed contact CR3 opens in the holding circuit to the clamp relay 12CR, de-energizing the relay 12CR with the resultant opening of the contact 12CR2 and the de-energizing of solenoid 6. This results in the clamp valve 84 shifting to a position to effect the movement of the piston 49 to the right, as viewed in FIG. 9, retracting the clamp 74.

The retracting of clamp 74 actuates the limit switch 8LS to close the contact 8LS1 and to open the contact 8LS2. The contact 8LS1 completes a circuit through the contact CR1 and the contact 15CR2 to energize the relay 3CR. At this time the normally closed contact 3CR1 opens to de-energize the relays 7CR and 15CR. The contact 3CR2 closes to complete a circuit to energize the solenoid 2 with the result that an index valve 92 controls the actuation of the fluid motor 76 to effect the movement of the piston 78 within the cylinder 77. At this time it is pointed out that fluid under pressure is supplied to the index valve 92 from the pump 85 by means of a fluid line 93. When the fluid motor 76 is actuated, the loading device 15 will index to deliver the ground workpiece to the discharge chute 16 and place a next unground workpiece in line with the faceplate 22 and the clamp 74. Motor 76 is reset immediately to starting position, closing limit switch 6LS.

Closing limit switch 6LS completes a circuit through contact CR2 to energize relay 7CR. Normally closed contact 7CR1 opens, de-energizing relay 3CR and opening contact 3CR2 to de-energize loader solenoid 2 and permit the reset of the loader. The limit switch 6LS remains closed until the end of the reset movement. Normally closed contact 3CR1 closes in the holding circuit for relay 7CR to hold the relay 7CR energized for the next grinding operation.

Although only one preferred embodiment of the invention has been specifically illustrated and described herein, it is to be understood that minor variations may be made in the work clamping apparatus with out departing from the spirit and scope of the invention, as defined in the appended claims.

We claim:

1. A work clamping unit particularly adapted for clamping a workpiece against rotating faceplate and like work driving member, said work clamping unit comprising:
   (a) a spindle;
   (b) means mounting said spindle for rotation about the axis thereof;
   (c) a clamping member mounted on said spindle in axial projecting relation; and
   (d) said spindle having flexing means incorporated therein to compensate for misalignment and surface irregularities between said clamping member and a workpiece,
   (e) said flexible means being axially spaced portions of said spindle.

2. A work clamping unit particularly adapted for clamping a workpiece against a rotating faceplate and like work driving member, said work clamping unit comprising:
   (a) a spindle;
   (b) means mounting said spindle for rotation about the axis thereof;
   (c) a clamping member mounted on said spindle in axial projecting relation; and
   (d) said spindle having flexing means incorporated therein to compensate for misalignment and surface irregularities between said clamping member and a workpiece, (e) said flexing means being disposed remote from said clamping member for automatically compensating for any eccentricity of said clamping member relative to the axis of rotation of a clamped workpiece.

3. The work clamping unit of claim 2 together with
(a) releasable means for initially holding said spindle against flexure due to said flexing means until said clamping member is in full clamping engagement with a workpiece.

4. The work clamping unit of claim 2 together with
(a) releasable means for initially holding said spindle against flexure due to said flexing means until said clamping member is in full clamping engagement with a workpiece;
(b) and means for automatically effecting the releasing of said releasable means when said clamping member is in full clamping engagement with a workpiece.

5. The work clamping unit of claim 1 wherein
(a) said flexing means are disposed adjacent each end of said spindle with
(b) one of said flexing means being disposed immediately adjacent said clamping member whereby compensation for out of parallel between co-acting surfaces of said clamping member and a workpiece is automatically effected upon contact; and
(c) the other of said flexing means being disposed remote from said clamping member for automatically compensating for any eccentricity of said clamping member relative to an axis of rotation of a clamped workpiece.

6. The work clamping unit of claim 5 wherein
(a) said one flexing means is initially free to flex; and
(b) holding means initially support said spindle against flexing at said second flexing means.

7. The work clamping unit of claim 5 wherein
(a) said one flexing means is initially free to flex;
(b) holding means initially support said spindle against flexing at said second flexing means; and
(c) means for simultaneously releasing said holding means to permit flexing of said other flexing means when a workpiece becomes clamped against the face plate.

8. A machine tool having a work clamping unit particularly adapted for clamping a workpiece against a rotating face plate and like work driving member, said work clamping unit comprising;
(a) a tubular support;
(b) a spindle;
(c) means mounting said spindle in said support for relative axial movement with respect to said support;
(d) said spindle having inner and outer ends;
(e) a work clamping member carried by said spindle outer end in projecting relative to said support; and
(f) said spindle having at least one flexible section intermediate said inner and outer ends to facilitate the alignment of said work clamping member with a workpiece.

9. The work clamping member of claim 8 wherein
(a) said flexible section is disposed axially outwardly of said mounting means and adjacent said spindle outer end to permit movement of said clamping member to compensate for imperfections in the relation between said face plate, said workpiece and said clamping member.

10. The work clamping member of claim 8 wherein
(a) said mounting means are disposed at said spindle inner end;
(b) said flexible section is disposed adjacent said spindle inner end; and
(c) said support and said spindle have cooperating spindle support means adjacent said spindle outer end initially rendering said flexible section inoperative and being releasable in response to relative axial movement of said spindle and said support.

11. The work clamping member of claim 8 wherein
(a) said spindle has two of said flexible sections;
(b) said mounting means are disposed at said spindle inner end;
(c) one flexible section is disposed adjacent said spindle inner end;
(d) a second flexible section is disposed axially outwardly of said mounting means and adjacent said spindle outer end to permit movement of said clamping member to compensate for out of parallel between contacting surfaces of said clamping member and a workpiece;
(e) said support and said spindle have cooperating spindle support means inwardly of and adjacent said second flexible section initially rendering said one flexible section ineffective while permitting flexing of said spindle at said second flexible section and being releasable in response to relative axial movement of said spindle and said support.

12. A work clamping assembly comprising
(a) a faceplate continuously rotatable about a fixed axis; and
(b) a work clamping unit opposing said faceplate in axial alignment therewith for clamping a workpiece against said faceplate, said work clamping unit comprising:
(c) a support;
(d) a spindle;
(e) means mounting said spindle within said support for rotation about the axis of said spindle with an outer end projecting out of said support towards said faceplate and for relative axial movement of said spindle and said support;
(f) a work clamping member carried by said spindle outer end in opposed relation to said faceplate and normally spaced from said faceplate a distance to permit a workpiece to freely move between said clamping member and said faceplate;
(g) means mounting said support for movement thereof together with said spindle and work clamping member towards and away from said faceplate;
(h) said spindle having at least one flexible section permitting alignment and full contact of said said work clamping member with a workpiece having surfaces out of parallel with said work clamping member;
(i) cooperating supporting surfaces on said clamp support and said spindle initially stabilizing said spindle and being released upon further advance of said support member after said clamping member clamps a workpiece against said faceplate and
(j) means for moving said support towards said faceplate to first move said work clamping member into clamping engagement with a workpiece and then move said support member further in the same direction to disengage said cooperating supporting surfaces.

13. The work clamping assembly of claim 12 together with
(a) a feed mechanism for feeding workpieces into the space between said faceplate and said work clamping member in timed relation to the actuation of said work clamping unit.

14. The work clamping assembly of claim 12 wherein
(a) said faceplate has a work centering device; and
(b) means mounting said work centering device for projection from said faceplate and for retraction before the end of a matching operation.

15. The work clamping assembly of claim 13 wherein
(a) said faceplate has a work centering device mounted for movement between a projecting position and a retracted position; and (b) means for effecting the movement of said work centering device and said work clamping members towards one another on opposite sides of a workpiece to center and clamp a workpiece.

16. The work clamping assembly of claim 13 wherein
(a) said faceplate has a work centering device mounted for movement between a projecting position and a retracted position;
(b) means for effecting the movement of said work centering device and said work clamping members towards one another on opposite sides of a workpiece to center and clamp a workpiece; and
(c) means for independently retracting said work centering device after the completion of a rough machining operation on a clamped workpiece.

17. A work clamping assembly comprising:
(a) a faceplate mounted for rotation about a fixed axis;
(b) a work clamping member opposing said faceplate in substantially axially aligned relation;
(c) a work centering member mounted within said faceplate in concentric relation for movement between a projecting work centering position and a retracted position wherein a centered workpiece may engage said faceplate, and
(d) said work clamping member is supported by a spindle having flexing means incorporated therein to compensate for misalignment and surface irregularities between a workpiece and said clamping member.

18. A work clamping unit particularly adapted for clamping a workpiece against a rotating faceplate and like work driving member, said work clamping unit comprising:
(a) a spindle;
(b) means mounting said spindle for rotation about the axis thereof;
(c) a clamping member mounted on said spindle in axial projecting relation; and
(d) said spindle having flexing means incorporated therein to compensate for misalignment and surface irregularities between said clamping member and a workpiece,
(e) means to apply low pressure to actuate said clamp until work is in firm contact with said faceplate,
(f) and means to apply high pressure thereafter to hold work during a machining operation.

References Cited

UNITED STATES PATENTS

| | | | |
|---|---|---|---|
| 1,873,752 | 8/1932 | Fraser | 51—237 |
| 2,356,839 | 8/1944 | Flanders | 51—237 |
| 2,478,607 | 8/1949 | Theler et al. | 51—236(X) |
| 2,581,928 | 1/1952 | Broden | |
| 2,599,987 | 6/1952 | Green | 51—101 |
| 2,727,342 | 12/1955 | Kopczynski | 51—236(X) |
| 2,784,534 | 3/1957 | Townsend et al. | 51—237(X) |
| 2,845,828 | 8/1958 | Thomeczek | 82—31 |
| 3,159,953 | 12/1964 | Balsiger | 51—237 |

OTHELL M. SIMPSON, Primary Examiner

U.S. Cl. X.R.

51—103, 237; 82—31, 45